United States Patent
Goetz et al.

(10) Patent No.: US 9,195,442 B2
(45) Date of Patent: Nov. 24, 2015

(54) SYSTEM AND METHOD FOR COMPILING LAMBDA EXPRESSION IN A PROGRAMMING LANGUAGE ENVIRONMENT

(71) Applicant: Oracle International Corporation, Redwood Shores, CA (US)

(72) Inventors: Brian Goetz, Williston, VT (US); Daniel Smith, Spanish Fork, UT (US); Maurizio Cimadamore, Dublin (IE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 282 days.

(21) Appl. No.: 13/779,557

(22) Filed: Feb. 27, 2013

(65) Prior Publication Data

US 2014/0019948 A1 Jan. 16, 2014

Related U.S. Application Data (60) Provisional application No. 61/669,771, filed on Jul. 10, 2012.

(51) Int. Cl.
*G06F 9/45* (2006.01)

(52) U.S. Cl.
CPC ...................................... *G06F 8/437* (2013.01)

(58) Field of Classification Search
None
See application file for complete search history.

(56) References Cited

U.S. PATENT DOCUMENTS

| | | | |
|---|---|---|---|
| 5,748,966 A | 5/1998 | Sato | |
| 7,873,592 B2 * | 1/2011 | Meijer et al. | 706/52 |
| 2006/0070028 A1 | 3/2006 | Belov et al. | |
| 2006/0130015 A1 * | 6/2006 | Griffin | 717/136 |
| 2006/0212847 A1 * | 9/2006 | Tarditi et al. | 717/117 |
| 2007/0044083 A1 * | 2/2007 | Meijer et al. | 717/151 |
| 2008/0228761 A1 * | 9/2008 | Kei Leung et al. | 707/5 |
| 2008/0320440 A1 | 12/2008 | Meijer et al. | |
| 2009/0328016 A1 * | 12/2009 | Ng et al. | 717/143 |
| 2010/0088679 A1 * | 4/2010 | Langworthy et al. | 717/126 |
| 2012/0079464 A1 | 3/2012 | De Smet et al. | |
| 2013/0125101 A1 * | 5/2013 | Pamer | 717/141 |
| 2013/0159981 A1 | 6/2013 | Klemenz et al. | |
| 2014/0019948 A1 * | 1/2014 | Goetz et al. | 717/143 |

OTHER PUBLICATIONS

State of the Lambda, 4th edition, Dec. 2011 retrieved Sep. 5, 2014, 8 pages, from <http://cr.openjdk.java.net/~briangoetz/lambda/lambda-state-4.html>.

(Continued)

*Primary Examiner* — Don Wong
*Assistant Examiner* — Hossain Morshed
(74) *Attorney, Agent, or Firm* — Tucker Ellis LLP (57) ABSTRACT

A system and method can support context-dependent expression compilation in a programming language environment. A compiler in the programming language environment can provide one or more context objects that operate to compile various context-dependent expressions in different programming contexts. Then, the compiler can use a said context object to derive a target type associated with a context-dependent expression, and use the context object to perform compatibility check for the context-dependent expression in the programming language environment.

20 Claims, 6 Drawing Sheets

(56) References Cited

OTHER PUBLICATIONS

Mads Torgersen et al., "Adding Wildcards to the Java Programming Language", Journal of Object Technology, Published by ETH Zurich, Chair of Software Engineering 2004 vol. 3, No. 11, 20 pages.

Goetz, Brian, Interface evolution via "public defender" methods, Third draft, Aug. 2010, 10 pages, retrieved Apr. 2, 2015 from: <http://cr.openjdk.java.net/~briangoetz/lambda/>.

Goetz, Brian, Interface evolution via virtual extension methods, Fourth draft, Jun. 2011, 12 pages, retrieved Apr. 2, 2015 from: <http://cr.openjdk.java.net/~briangoetz/lambda/>.

Goetz, Brian et al., Featherweight Defenders: A formal model for virtual extension methods in Java, Oracle Corporation, Mar. 27, 2012, 9 pages, retrieved Apr. 2, 2015 from: <http://cr.openjdk.java.net/~briangoetz/lambda/>.

Goetz, Brian, Featherweight Defenders, Jan. 19, 2011, 6 pages, retrieved Apr. 2, 2015 from: <http://cr.openjdk.java.net/~briangoetz/lambda/>.

Goetz, Brian, Featherweight Defenders, Jan. 31, 2011, 6 pages, retrieved Apr. 2, 2015 from: <http://cr.openjdk.java.net/~briangoetz/lambda>.

Goetz, Brian et al., Featherweight Defenders: A formal model for virtual extension methods in Java, Oracle Corporation Dec. 2, 2011, 9 pages, retrieved Apr. 2, 2015 from: <http://cr.openjdk.java.net/~briangoetz/lambda/>.

Reinhold, Mark, Project Lambda: Straw-Man Proposal, licensed under a Creative Commons Attribution-Share Alike 3.0 U.S. License, Dec. 2009, 7 pages, retrieved Apr. 2, 2015 from: <http://cr.openjdk.java.net/~mr/lambda>.

Goetz, Brian, State of the Lambda, Version 2, Jul. 6, 2010, 7 pages, retrieved Apr. 2, 2015 from: <http://cr.openjdk.java.net/~briangoetz/lambda/>.

Goetz, Brian, State of the Lambda, Oct. 10, 2010, 7 pages, retrieved Apr. 2, 2015 from: <http://cr.openjdk.java.net/~briangoetz/lambda/>.

Goetz, Brian, State of the Lambda, Dec. 2011, 4th edition, 10 pages, retrieved Apr. 2, 2015 from: <http://cr.openjdk.java.net/~briangoetz/lambda/>.

Goetz, Brian, Translation of Lambda Expressions, Apr. 2012, 10 pages, retrieved Apr. 2, 2015 from: <http://cr.openjdk.java.net/~briangoetz/lambda/>.

Goetz, Brian, Java theory and practice: Going wild with generics, Part 1 Understanding wildcard capture, May 6, 2008, 8 pages.

Goldman Sachs, GS Collections User Reference Guide, Copyright 2011 Goldman Sachs Version 1.2.0 (Mar. 14, 2012), 44 pages.

\* cited by examiner

SYSTEM AND METHOD FOR COMPILING LAMBDA EXPRESSION IN A PROGRAMMING LANGUAGE ENVIRONMENT

CLAIM OF PRIORITY

This application claims priority on U.S. Provisional Patent Application No. 61/669,771, entitled "SYSTEM AND METHOD FOR CHECKING COMPATIBILITY OF LAMBDA EXPRESSIONS," by inventors Brian Goetz, Daniel Smith, and Maurizio Cimadamore, filed Jul. 10, 2012, which application is herein incorporated by reference.

CROSS REFERENCE TO RELATED APPLICATIONS

This application is related to the following patent application, which is hereby incorporated by reference in its entirety:

U.S. patent application Ser. No. 13/779,536, entitled "SYSTEM AND METHOD FOR SUPPORTING COMPATIBILITY CHECKING FOR LAMBDA EXPRESSION", by inventors Brian Goetz, Daniel Smith, Maurizio Cimadamore, filed Feb. 27, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting compilation in a programming language environment.

BACKGROUND

An object-oriented programming language, e.g. the Java™ programming language, can dynamically encapsulate program behavior with methods in classes. However, the objects in the object-oriented programming language tend to be relatively heavyweight, due to the instantiation of separately-declared classes wrapping a handful of fields and different methods. Given the increasing relevance of callbacks and other functional-style idioms, it is beneficial that modeling code as data in the object-oriented programming language can be as lightweight as possible.

This is the general area that embodiments of the invention are intended to address.

SUMMARY

Described herein are systems and methods that can support compiling context-dependent expressions in a programming language environment. A compiler in the programming language environment can provide one or more context objects that operate to compile various context-dependent expressions in different programming contexts. Then, the compiler can use a said context object to derive a target type associated with a context-dependent expression, and use the context object to perform compatibility check for the context-dependent expression in the programming language environment.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Java™ programming language environment as an example for a programming language environment. It will be apparent to those skilled in the art that other types of programming language environments can be used without limitation.

Described herein are systems and methods that can support context-dependent expression compilation in a programming language environment.

Figure 1:
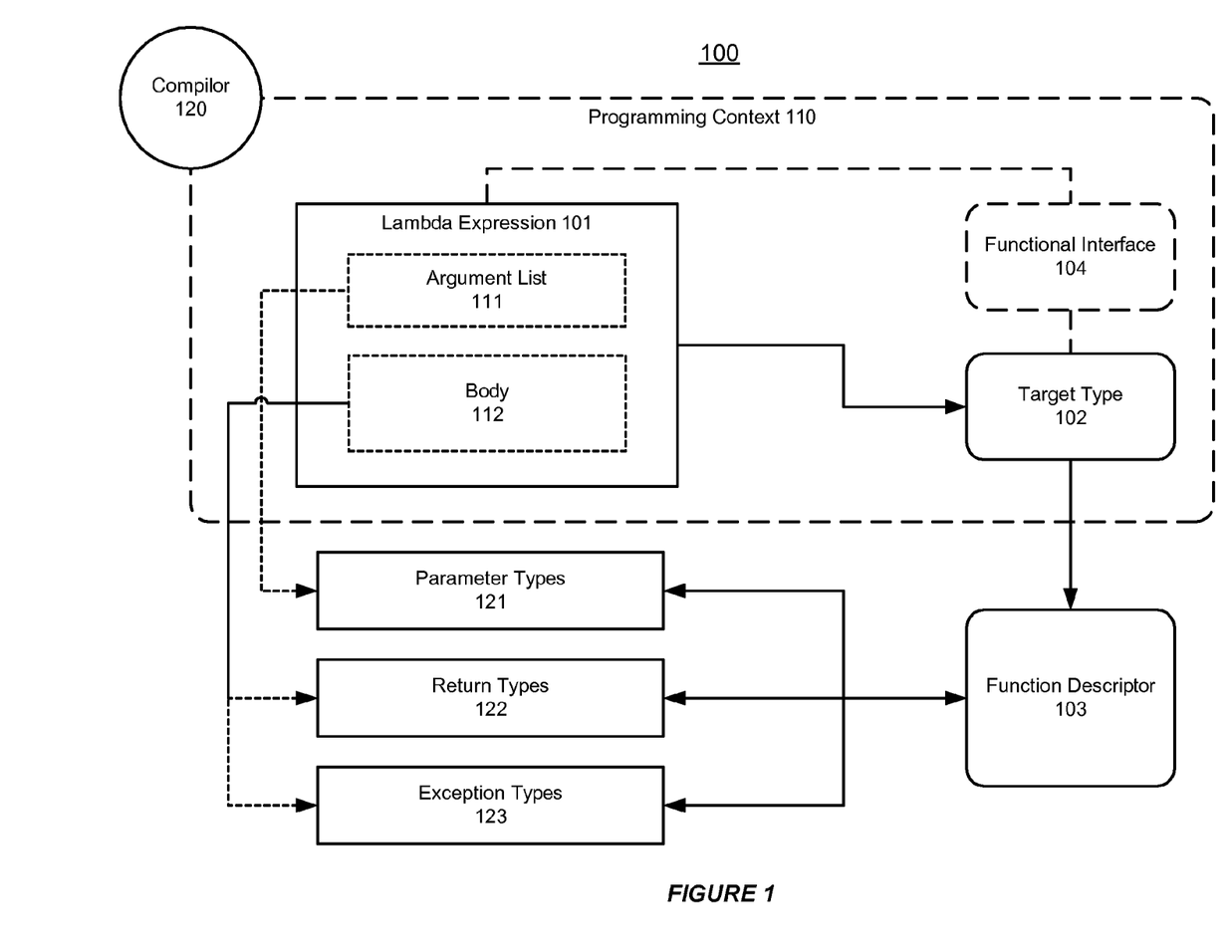
FIG. 1 shows an illustration of supporting compatibility checking in a programming language environment in accordance with various embodiments of the invention.

FIG. 1 shows an illustration of supporting compatibility checking in a programming language environment in accordance with various embodiments of the invention. As shown in FIG. 1, an expression, e.g. a lambda expression 101, can be supported in a programming language environment 100, e.g. using the Java™ programming language.

Lambda expressions 101 can be anonymous methods, which are aimed at addressing the "vertical problem," or bulky syntax, by replacing the machinery of anonymous inner classes with a syntactically lighter-weight mechanism. The general syntax of the lambda expression 101 can include an argument list 111 and a body 112. Additionally, the syntax of the lambda expression 101 can include an arrow token "→."

In the example of the Java™ programming language environment, the argument list 111 can include one or more parameters. The body 112 can be either a single expression or a statement block. In the expression form, the body is simply evaluated and returned. In the block form, the body is evaluated like a method body—a return statement returns control to the caller of the anonymous method. Furthermore, non-local control elements, e.g. break and continue, are illegal at the top level in the lambda expression, but are permitted within loops. If the body produces a result, every control path is required to return something or throw an exception.

The following are examples of lambda expressions.

```
(int x, int y) -> x + y
() -> 42
(String s) -> { System.out.println(s); }
```

The first lambda expression takes two integer arguments, named x and y, and returns x+y. The second lambda expression takes no arguments and returns the integer 42. The third lambda expression takes a string and prints it to the console, returning nothing.

The lightweight syntax for the lambda expression 101 can be optimized for the common usage in various programming language environments 100. In the example of the Java™ programming language environment, the expression-body form eliminates the need for a return keyword, which could otherwise represent a substantial syntactic overhead relative to the size of the expression.

A compiler 120 in the programming language compiling environment 100 can derive and/or infer various types associated with the lambda expression 101 that can be used for compatibility check. Such types can include one or more parameter types 121, one or more return types 122 from the expression body 112 and one or more exception types 123, or thrown types, from the expression body 112. For example, when the argument list 111 in the lambda expression 101 includes a type of expression, then the compiler 120 can infer the parameter type 121 at runtime.

In accordance with various embodiments of the invention, the lambda expression 101 can have a type that can be deduced at compile time. When the lambda expression 101 appears in a programming context 110, it should be compatible with a type expected in that context, which is referred to as a target type 102. If the lambda expression 101 is not compatible with the target type 102, an error can occur at compile time.

In accordance with various embodiments of the invention, the functional interface 104, or class, can be used for imputing an isomorphism between the set of typed functions and a subset of legal nominal types in an object-oriented programming language. The functional interface 104, or class, which may be considered as "functions in disguise," can have one method meeting one or more criteria that define that method as relevant in a counting system. In the example of the Java™ programming language environment, a functional interface 104 can have only one method excluding the methods that are inherited from the Object class. Additionally, each functional interface 104, or class, can have a function descriptor, which is the method type of the single method.

For example, in the Java™ programming language specification, the following interfaces can be considered as functional.
  java.lang.Runnable with a function descriptor ( )→void
  java.util.concurrent.Callable with a function descriptor ( )→V
  java.security.PrivilegedAction with a function descriptor ( )→T
  java.util.Comparator with a function descriptor (T,T)→int
  java.io.FileFilter with a function descriptor (File)→boolean
  java.nio.file.PathMatcher with a function descriptor (Path)→boolean
  java.lang.reflect.InvocationHandler with a function descriptor (Object, Method, Object[ ])→object
  java.beans.PropertyChangeListener with a function descriptor (PropertyChangeEvent)→void
  java.awt.event.ActionListener with a function descriptor (ChangeEvent)→void
  javax.swing.event.ChangeListener with a function descriptor (ActionEvent)→void The compiler 120 can structurally (i.e., without instruction from the user) recognize which interfaces/class has this characteristic or is functional, mechanically derive a function descriptor for the interfaces/class, and use that function descriptor for representing lambda expressions in a nominal object-oriented type system.

The lambda expression 101 may only appear in a programming context 110 that has a target type 102. The lambda expression 101 can be context-dependent, which means that the lambda expression 101 can be associated with a target type 102 that is expected to be different in different programming contexts 110.

In accordance with various embodiments of the invention, the compiler 120 can infer a target type 102 of the lambda expression 101 based on the programming contexts 110, since a target type 102 can be expected in the programming context 110, in which the lambda expression appears.

Furthermore, the compiler 120 can check whether the target type 102 is functional based on its structure. The compiler 120 can determine that the target type 102 is functional when the target type 102 represents a single function contract, e.g. implementing a functional interface 104 that has only one abstract method.

Additionally, the compiler 120 can use a process for identifying whether an interface is a functional interface 104 in the programming language environment 100. Such a process can be more complex than simply counting method declarations, since an interface may inherit methods from multiple parents that logically represent the same method, or it may redundantly declare a method that is automatically provided by the class Object, e.g. toString( ).

After determining that the target type 102 is functional, the compiler 120 can derive a function descriptor 103, i.e. method signatures, from the target type 102. The function descriptor 103 of a functional interface 104 can include a method type, type parameters, formal parameter types, return types, and thrown types.

Then, the compiler 120 can check whether the different types 121-123 associated with the lambda expression 101 are consistent with the function descriptor 103 for the target type 102.

In accordance with various embodiments of the invention, a lambda expression 101 can be considered as compatible with a target type 102, T, if the following conditions hold:
  T is a functional interface type,
  The parameters of the lambda expression are compatible with T, e.g. the lambda expression has the same number of parameters as T's method, and those parameters' types are the same or assignment-compatible,
  Each expression returned by the lambda body is compatible with T's method's return type, and
  Each exception thrown by the lambda body is allowed by T's method's throws clause.

Thus, the programming language environment 100 allows programmers to safely express what they mean without excessive syntactic overhead.

For example, by taking advantage of the target typing, the programming language environment 100 allows the lambda expression 101 to avoid repeating parameters types 121 for the lambda expression 101, since the compiler 120 can have knowledge of the parameter types 121 used by the lambda expression 101 based on the target type 102.

For example, in the Java™ programming language environment, there is no need for specifying parameters types for variable s1 and s2, since the Java™ compiler can derive the String parameter types based on the target type, Comparator.

```
Comparator<String>c=(s1,s2)→
    s1.compareToIgnoreCase(s2);
```

In addition, when there is just one parameter, the type of which can normally be inferred, the parentheses surrounding a single parameter name can be optional.

```
FileFilter java = f -> f.getName( ).endsWith(".java");
button.addActionListener(e -> ui.dazzle(e.getModifiers( )));
```

Furthermore, different programming contexts 110, such as an assignment context, an invocation context, and a casting context, can be supported in the programming language compiling environment 100. Since a different target type 102 is expected to be associated with the lambda expression 101 in a different programming context 110, the type-checking of the lambda expression 101 in a different programming context 110 can be different.

From the perspective of a compiler 120, the lambda expression 101 can be used to create an instance of a target type 102. Also, the compatibility check between return expression of the lambda body and expected return types in the target type 102 can depend on the context.

The following example shows how the interpretation of the body of a lambda expression can vary depending on the context. In this example, a functional interface can be defined as

```
interface Target {
    int m( );
}
```

Assuming a variable, longVar, is defined with a long type, the following expression, which is in an assignment context, may be rejected by the compiler 120 for the reason of possible loss of precision.

Target t=( )→longVar;

On the other hand, the following expression, which is in a cast context, may actually be accepted by the compiler 120.

Figure 2:
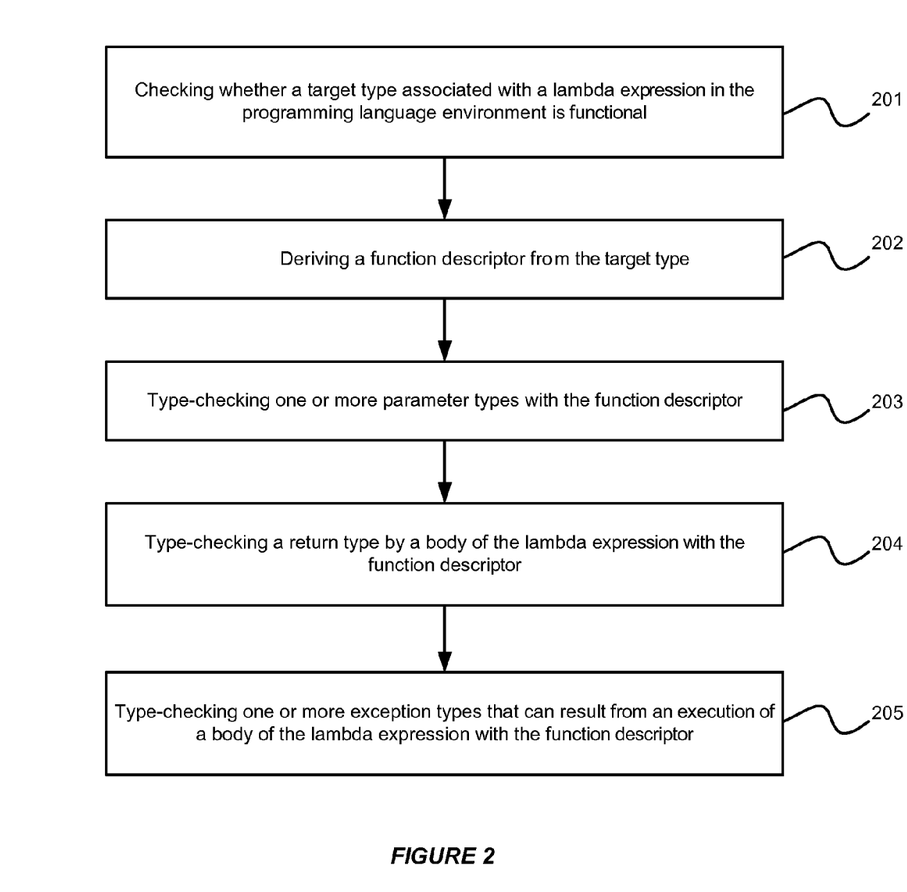
FIG. 2 illustrates an exemplary flow chart for supporting compatibility checking in a programming language environment in accordance with an embodiment of the invention.

Object o=(Target)( )→longVar;

FIG. 2 illustrates an exemplary flow chart for supporting compatibility checking in a programming language environment in accordance with an embodiment of the invention. As shown in FIG. 2, at step 201, a compiler in the programming language compiling environment can check whether a target type associated with a lambda expression in the programming language environment is functional. Then, at step 202, the compiler can derive a function descriptor from the target type. Furthermore, the compiler can type-check the expression with the function descriptor associated with the target type. For example, at step 203, the compiler can type-check one or more parameter types with the function descriptor; at step 204, the compiler can type-check a return type by a body of the lambda expression with the function descriptor; and at step 205, the compiler can type-check one or more exception types that can result from an execution of the body of the lambda expression with the function descriptor.

Type Cache

Figure 3:
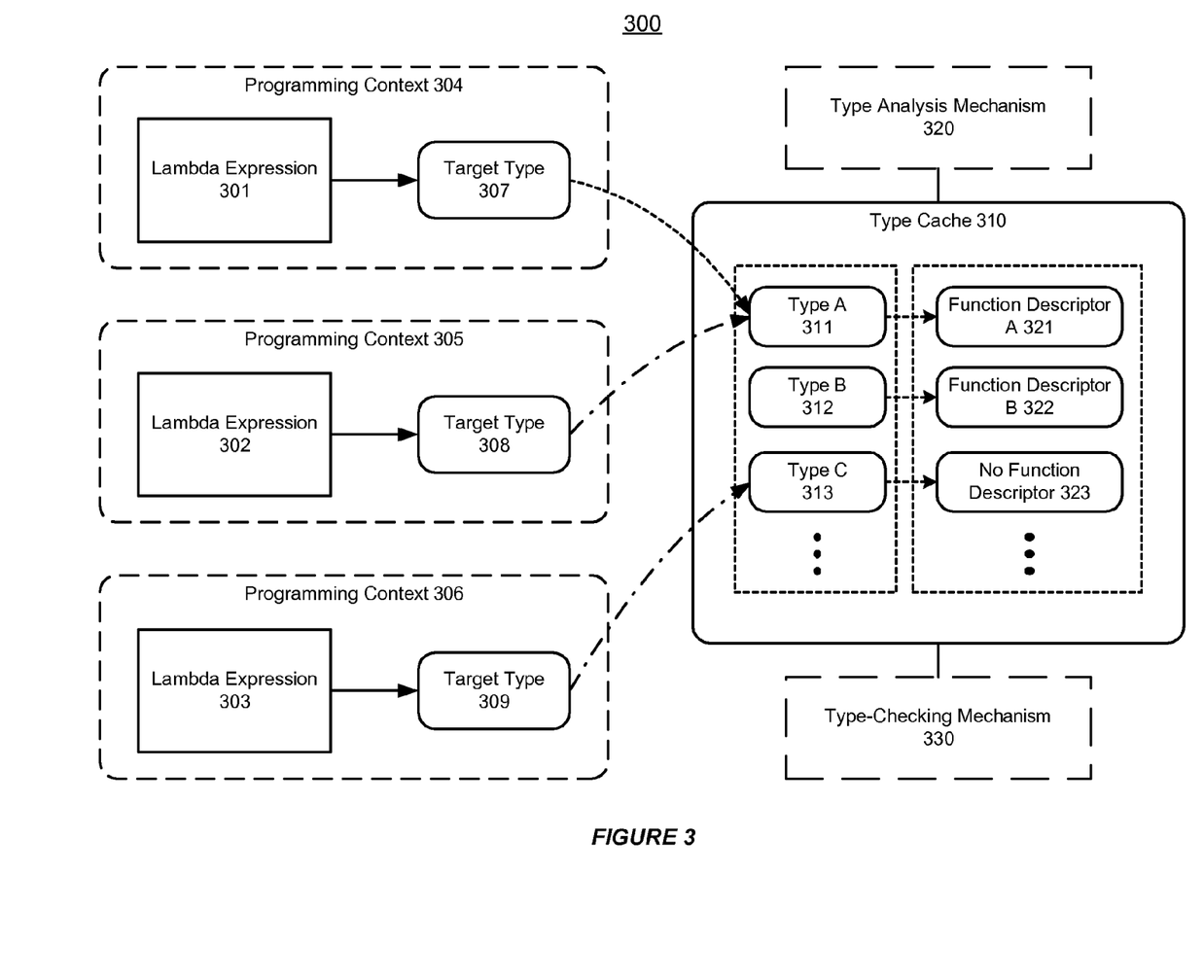
FIG. 3 shows an illustration of using a type cache to support checking compatibility in a programming language environment, in accordance with various embodiments of the invention.

FIG. 3 shows an illustration of using a type cache to support compatibility checking in a programming language environment, in accordance with various embodiments of the invention. As shown in FIG. 3, a type cache 310 in a programming language environment 300 can support compiling one or more expressions, e.g. lambda expressions 301-303, in various programming contexts 304-306.

The type cache 310 can map one or more types, e.g. types A-B 311-312, to various function descriptors, e.g. function descriptors A-B 321-322. Furthermore, the type cache 310 can be based on a lazy caching approach. In other words, the type cache 310 can be empty when first initiated, and may be populated with new entries only when it is necessary.

For example, when the lambda expression 301 is compiled within a programming context 304, the compiler can derive or infer a target type 307 from the lambda expression 301 based on the programming context 304. The compiler can further analyze target type 307 and populate the type cache 310 with an entry for the type A 311.

A type analysis process 320 can be used in order to determine whether the target type 307 is functional. The type analysis process 320 can also be used to find out a corresponding function descriptor A 321 for the target type 307. The type analysis process 320 can be expensive and time consuming, since it involves analyzing not only the target type 307 but also other types related to the target type 307, such as its ancestors.

In order to avoid repeating the type analysis process 320 for the same type, e.g. type A 311, the compiler can write the function descriptor A 321 into the type cache 310 as an entry that is corresponding to the type A 311. Thus, the compiler can easily obtain a corresponding function descriptor A 321 for the type A 311 from the type cache 310, when the type A 311 is in use again.

For example, when another lambda expression 302 is compiled within a programming context 305, the compiler can derive or infer a target type 308 from the lambda expression 302 based on the programming context 305. In such a case, the compiler can easily obtain the corresponding function descriptor A 321 from the type cache 310, since the target type 308 also has a type A 311. Then, the function descriptor A 321 for the target type 308 can be provided to a type checking mechanism 330, which in turn can proceed with the compatibility check.

Additionally, the type cache 310 can mark a type C 313 to be not functional and not associated with any function descriptor 323. Thus, when the lambda expression 303 is compiled within a programming context 306, a target type 309 (which refers to the type C 313) can be derived or inferred from the lambda expression 301 based on the programming context 304. Then, the compiler can be aware of that target type 309 is not functional by simply checking for the type C 313 in the type cache 310, without a need to repeat performing the type analysis process 320.

Context Object

Figure 4:
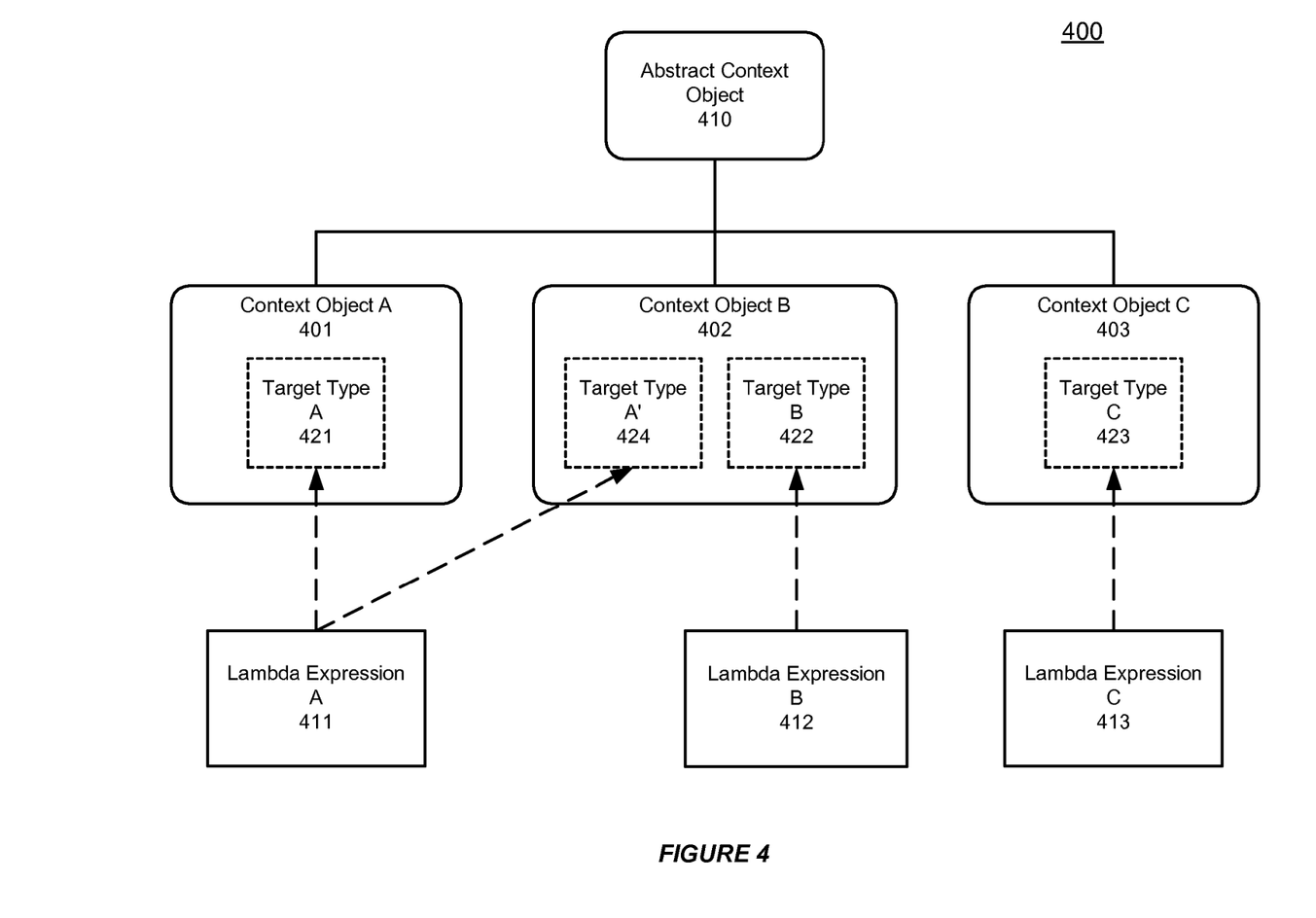
FIG. 4 shows an illustration of using different context objects to support checking compatibility in a programming language environment, in accordance with various embodiments of the invention.

FIG. 4 shows an illustration of using different context objects to support compatibility checking in a programming language environment, in accordance with various embodiments of the invention. As shown in FIG. 4, a plurality of context objects, e.g. context objects A-C 401-403, can be provided in a programming language environment 400 to encapsulate different programming contexts. Each of the context objects A-C 401-403 can encapsulate a particular programming context, such as an assignment context, an invocation context, or a casting context, and provide a corresponding implementation for supporting compatibility checking in that particular programming context.

As it may be applied in the previous example, the following expression can be compiled, or checked for compatibility, using an assignment context object, which may reject this expression for the reason of possible loss of precision.

Target $t=(\ ) \rightarrow$ longVar;

On the other hand, the following expression can be compiled, or checked for compatibility, using a cast context object, which may actually accept this expression.

Object $o=$(Target)$(\ ) \rightarrow$ longVar;

As shown in FIG. 4, a context object, e.g. the context object C 403, can be used to compile a context-dependent expression, e.g. the lambda expression 413, within a specific programming context that is encapsulated by the context object C 403. For example, the context object C 403 can derive a target type C 423 for the lambda expression 413.

Furthermore, a context-dependent expression can be compiled using different context objects. The different context objects can derive a corresponding target type that is expected for the lambda expression in the different programming contexts. As shown in FIG. 4, the context objects A-B 401-402 can be used to compile a lambda expression A 411. In this example, a target type A 421 can be derived using the context object A 401 while a target type A' 424 can be derived using the context object B 402. Then, the context objects A-B 401-402 can proceed with compatibility checking for different programming contexts, based on the different target types A 422 and A' 424.

Additionally, a context object can be used to compile different lambda expressions. As shown in FIG. 4, the context object B 402 can be used to compile both the lambda expressions A 411 and B 412. The context object B 402 can derive a different target type, e.g. target type A' 424 and target type B 422 respectively, for the lambda expressions A 411 and B 412. Additionally, there can be an abstract context object 410, from which the different context objects A-C 401-403 can either implement or extend.

Figure 5:
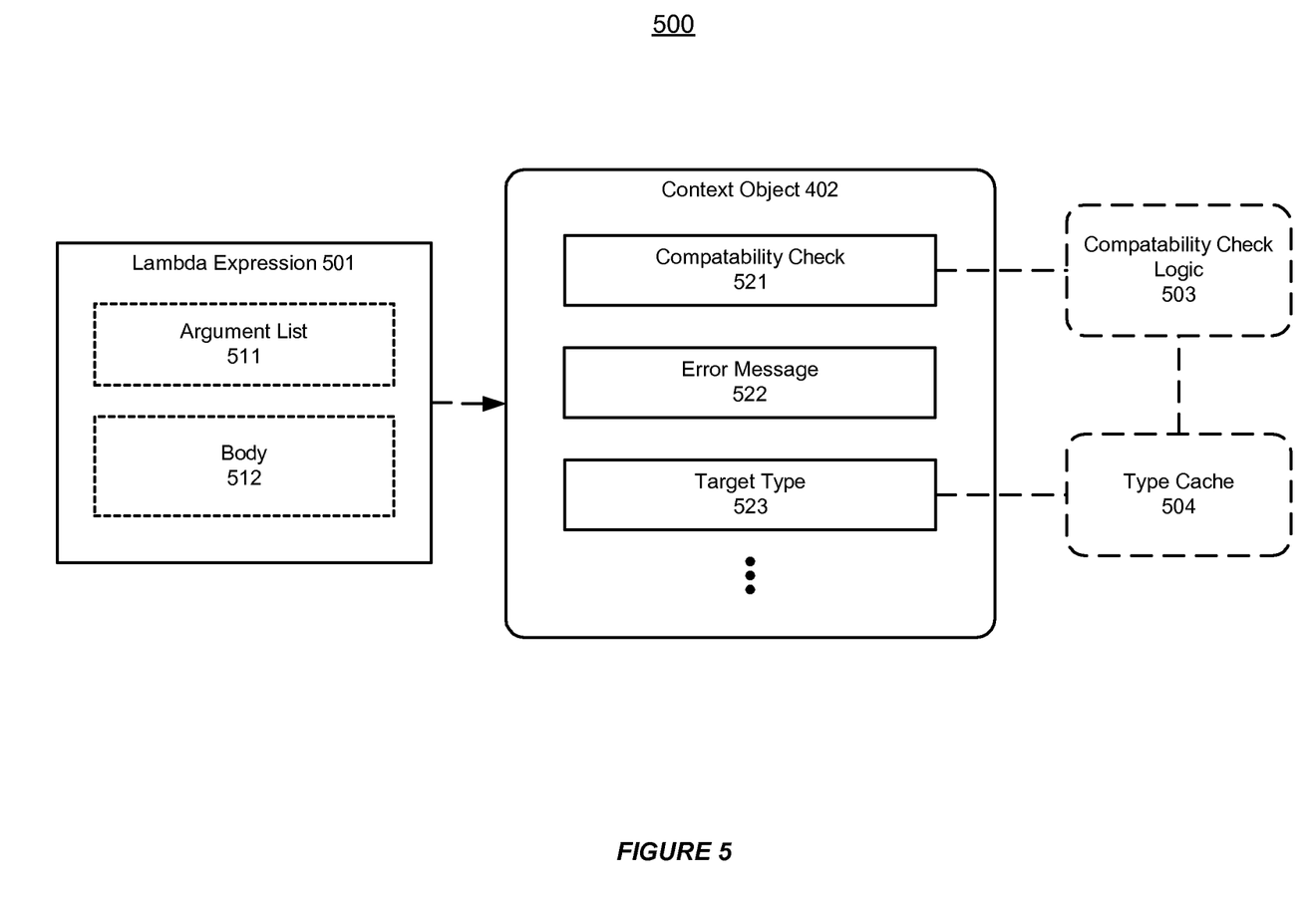
FIG. 5 shows an illustration of a context object in a programming language environment, in accordance with various embodiments of the invention.

FIG. 5 shows an illustration of a context object in a programming language environment, in accordance with various embodiments of the invention. As shown in FIG. 5, a context dependent expression, e.g. a lambda expression 501, can be compiled in a programming language environment 500 using a context object 502. The lambda expression 501 includes an argument list 511 and a body 512.

The context object 502 can encapsulate a particular programming context in the programming language environment 500, such as an assignment context, an invocation context, and a casting context. The context object 502 can perform different context specific operations, such as a compatibility check operation 521, an error messaging operation 522, and a target typing operation 523.

The context object 502 can perform a context-dependent target typing operation 523 on the lambda expression 501 to obtain a context-dependent target type for the lambda expression 501. Then, the context object 502 can obtain a function descriptor from a type cache 504 based on the target type obtained and perform compatibility check.

Since a different target type may be expected for the lambda expression 501 in different programming contexts, the implementation for compatibility checking the lambda expression 501 in different programming contexts can also be different. The context object 502 can use separate compatibility check logic 503 to perform the compatibility check operation 521, so that the context object 502 can share the compatibility check logic 503 with other context objects in the programming language environment 500. Thus, the compatibility check logic 503 can be easily maintained and updated among different context objects in a centralized fashion.

Additionally, the context object 502 can perform context-dependent error messaging operations 522. Different error messages may be expected for compiling a same lambda expression 501 in different programming contexts. For example, an error message in an assignment context can be simple and straight-forward, while a similar error message in an invocation context may need to be embedded into other error messages.

Figure 6:
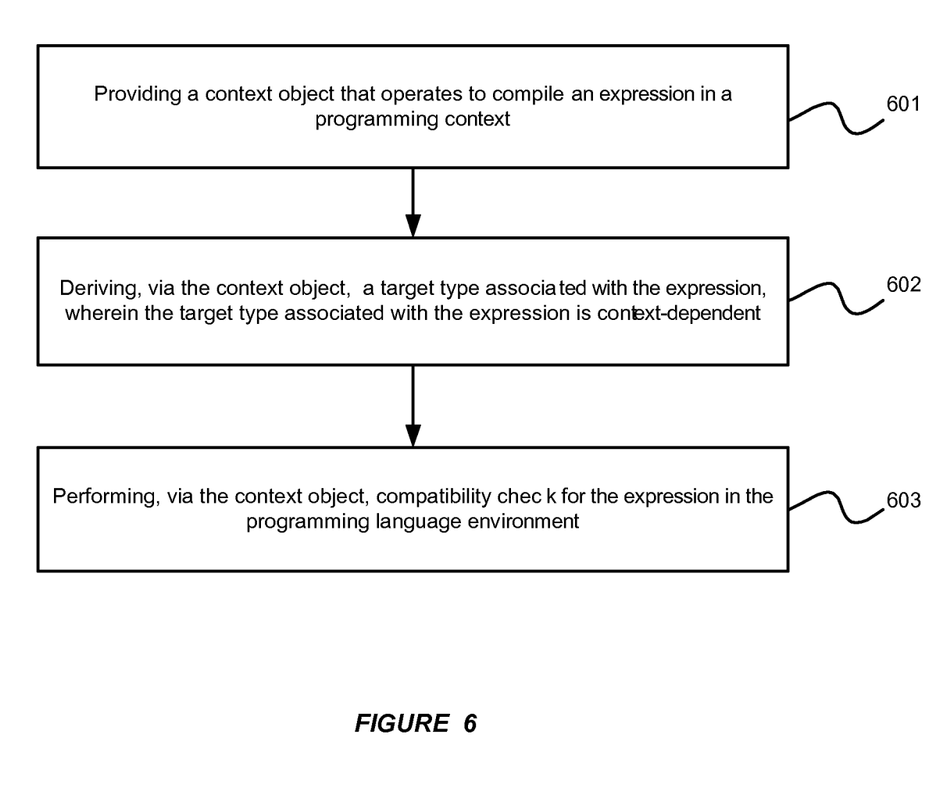
FIG. 6 illustrates an exemplary flow chart for using context objects to support compiling context-dependent expressions in a programming language environment in accordance with an embodiment of the invention.

FIG. 6 illustrates an exemplary flow chart for using context objects to support compiling context-dependent expressions in a programming language environment in accordance with an embodiment of the invention. As shown in FIG. 6, at step 601, the programming language environment can provide a context object that operates to compile an expression in a programming context. Then, at step 602, the programming language environment can use the context object to derive a target type associated with the expression, wherein the target type associated with the expression is context-dependent. Furthermore, at step 603, the programming language environment can use the context object to perform compatibility check for the expression in the programming language environment The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting context-dependent expression compilation in a programming language environment operating on one or more microprocessors, comprising:
    providing a context object that operates to compile an expression in at least one of a plurality of programming contexts encapsulated by the context object;
    deriving, via the context object, a target type associated with the expression, wherein the target type associated with the expression is dependent on the at least one of a plurality of programming contexts;

deriving a function descriptor for the target type; and performing, via the context object, a compatibility check for the expression in the programming language environment including checking whether any type associated with the expression is consistent with the function descriptor for the target type.

2. The method according to claim 1, further comprising: allowing the expression to be a lambda expression that provides a list of formal parameters and a body.

3. The method according to claim 1, further comprising: providing, via the context object, one or more error messages for the expression in the programming language environment.

4. The method according to claim 1, further comprising: allowing use of the context object to compile another expression in the programming language environment.

5. The method according to claim 4, further comprising: deriving, via the context object, another target type associated with the expression; and performing, via the context object, compatibility check for the another expression in the programming language environment.

6. The method according to claim 1, further comprising: providing another context object that operates to compile the expression in another programming context.

7. The method according to claim 6, further comprising: deriving, via the another context object, another target type associated with the expression; and performing, via the another context object, compatibility check for the expression in the programming language environment.

8. The method according to claim 1, further comprising: providing a type cache in the programming language environment, wherein the type cache maps each type in one or more types to the function descriptor.

9. The method according to claim 8, further comprising: indicating that a said type is not function and do not have the function descriptor.

10. The method according to claim 9, further comprising: allowing the context object to share compatibility check logic with another context object.

11. A system for supporting context-dependent expression compilation in a programming language environment, comprising:
one or more microprocessors;
a compiler, running on the one or more microprocessors, that operates to perform the steps comprising:
providing a context object that operates to compile an expression in at least one of a plurality of programming contexts encapsulated by the context object;
using the context object to derive a target type associated with the expression, wherein the target type associated with the expression is dependent on the at least one of a plurality of programming contexts;
deriving a function descriptor for the target type; and
using the context object to perform a compatibility check for the expression in the programming language environment including checking whether any type associated with the expression is consistent with the function descriptor for the target type.

12. The system according to claim 11, wherein: the expression is a lambda expression that provides a list of formal parameters and a body.

13. The system according to claim 11, wherein: the compiler operates to use the context object to provide one or more error messages for the expression in the programming language environment.

14. The system according to claim 11, wherein: the compiler operates to use the context object to compile another expression in the programming language environment.

15. The system according to claim 14, wherein: the compiler operates to use the context object to derive another target type associated with the another expression; and perform compatibility check for the another expression in the programming language environment.

16. The system according to claim 11, wherein: the compiler operates to provide another context object that operates to compile the expression in another programming context.

17. The system according to claim 16, wherein: the compiler operates to use the another context object to derive another target type associated with the expression; and perform compatibility check for the expression in the programming language environment.

18. The system according to claim 11, wherein: the compiler operates to provide a type cache in the programming language environment, wherein the type cache maps each type in one or more types to the function descriptor.

19. The system according to claim 18, wherein: the type cache operates to indicate that a said type is not function and do not have the function descriptor.

20. A non-transitory machine readable storage medium having instructions stored thereon that when executed cause a system to perform the steps comprising:
providing a context object that operates to compile an expression in at least one of a plurality of programming contexts encapsulated by the context object;
using the context object to derive a target type associated with the expression, wherein the target type associated with the expression is dependent on the at least one of a plurality of programming contexts;
deriving a function descriptor for the target type; and
using the context object to perform a compatibility check for the expression in the programming language environment including checking whether any type associated with the expression is consistent with the function descriptor for the target type.

* * * * *